United States Patent [19]

Gijzen

[11] 4,394,755

[45] Jul. 19, 1983

[54] BEARING ARRANGEMENT FOR AN OBJECTIVE OF AN OPTICAL APPARATUS FOR WRITING AND/OR READING RECORDING TRACKS BY MEANS OF A RADIATION BEAM

[75] Inventor: Wilhelmus A. H. Gijzen, Eindhoven, Netherlands

[73] Assignee: U.S. Philips Corporation, New York, N.Y.

[21] Appl. No.: 207,510

[22] Filed: Nov. 17, 1980

[30] Foreign Application Priority Data

Jul. 31, 1980 [NL] Netherlands .......................... 8004380

[51] Int. Cl.³ .......................... G11B 7/08; G11B 7/12; G11B 21/12
[52] U.S. Cl. ........................................ 369/45; 364/44
[58] Field of Search .................................. 369/43–45, 369/109–112, 121–122; 358/127–132; 250/201–202, 204, 239, 570

[56] References Cited

U.S. PATENT DOCUMENTS

| 4,021,101 | 5/1977 | Camerik | 369/45 |
| 4,032,776 | 6/1977 | Van Rosmalen | 369/45 |
| 4,092,529 | 5/1978 | Aihara et al. | 369/44 |
| 4,135,083 | 1/1979 | Van Alem et al. | 250/201 |
| 4,135,206 | 1/1979 | Kleuters et al. | 369/45 |
| 4,190,775 | 2/1980 | Sakurai et al. | 250/570 |
| 4,193,091 | 3/1980 | Kleuters et al. | 369/44 |
| 4,252,412 | 2/1981 | Camerik | 369/112 |
| 4,302,830 | 11/1981 | Humaroka et al. | 369/45 |

FOREIGN PATENT DOCUMENTS 55-42368  3/1980  Japan .................................... 369/45

Primary Examiner—Raymond F. Cardillo, Jr.
Attorney, Agent, or Firm—Thomas A. Briody; Robert T. Mayer; Algy Tamoshunas

[57] ABSTRACT

An optical apparatus (1) for reading a recording track on an optical disc (3) comprises an objective (6) supported by a combined bearing arrangement which permits translations (12) of the objective for focussing a light beam (2) on the disc and pivotal movements (13, 14) for following the recording track in a radial and eventually also a tangential direction. The combined bearing arrangement comprises a plain bearing with a stationary member (17) having a convex outer surface (18) and a cylindrical moving member (19) which relative to the stationary member moves in a sliding and a pivoting fashion.

11 Claims, 5 Drawing Figures

BEARING ARRANGEMENT FOR AN OBJECTIVE OF AN OPTICAL APPARATUS FOR WRITING AND/OR READING RECORDING TRACKS BY MEANS OF A RADIATION BEAM

The invention relates to an optical apparatus for, during operation, writing and/or reading recording tracks in a recording surface of a record carrier by means of a radiation beam which is produced by a radiation source and, more specifically, for scanning video and/or audio recording tracks in a reflecting recording surface of a rotary video or audio disc by means of a light beam, which apparatus comprises: a frame; an objective for concentrating the radiation beam to a radiation spot in a focussing plane, which objective has an upper end which during operation faces the recording surface of a record carrier, and a lower end, which is remote from the recording surface, and comprises a lens system with an optical axis; a combined bearing arrangement for the objective, which arrangement is a combination of, firstly a focussing bearing-arrangement which is adapted to realize focussing movements of the objective between a rest position and an operating position and relative to the frame in a direction which at least substantially coincides with the optical axis so as to enable any deviations from an average position of the recording surface of the carrier in a direction perpendicular to the recording surface to be followed with the focussing plane and, secondly, a pivotal bearing arrangement which is adapted to realize pivotal movements of the objective relative to the frame in pivoting directions about an axis substantially perpendicular to the optical axis of the lens system, so as to enable any deviations from an average position of the recording tracks in directions situated in the recording surface to be followed with the radiation spot; electrically controllable focussing means for electrically realizing and controlling the focussing movements of the objective; as well as electrically controllable pivoting means for electrically realizing and controlling the pivotal movements of the objective.

Such an optical apparatus is known from U.S. Pat. No. 4,135,206. In this known apparatus the objective is journalled near its lower end in a corrugated loudspeaker diaphragm made of impregnated fabric fibre, which diaphragm allows the various movements of the objective. The lens system is located near the upper end of the objective and is mounted in a tubular sleeve. The diaphragm is connected to the lower end of the sleeve, near a cylindrical coil for the focussing movements. For the pivotal movements there are provided coils which are connected to the objective near the upper end and which move in air gaps of associated permanent-magnet stators which are rigidly mounted on the frame.

It is found that an important source of undesired noise in optical disc players such as video disc players is formed by the focussing movements of the objective. The video disc rotates with a frequency of rotation of 50 or 60 Hz, depending on the local mains frequency. Irregularities in the disc surface give rise to focussing movements of the objective with a fundamental frequency of 50 or 60 Hz and, moreover, to harmonics with frequencies of approximately 5 or 6 kHz. The sound waves produced by the moving objective therefore have frequencies which are situated in the very frequency range to which the human ear is highly sensitive. For this reason it is useful to minimise the projection of all parts which move along with the objective onto a plane perpendicular to the optical axis of the lens system, in order to obtain a minimal sound pressure during focussing movements. Therefore, the use of a diaphragm for journalling the objective is to be regarded as less satisfactory in view of the reduction of annoying sounds. Moreover, a corrugating diaphragm made of fabric fibre does not present a high resistance to transverse movements of the objective, so that under certain conditions, apart from the desired focussing movements and pivotal movements, the objective may also perform translation movements transversely of the optical axis. The diaphragm, which should be rigidly connected to the objective and to the frame, furthermore complicates the rapid and easy replacement of the objective.

It is the object of the invention to provide an optical apparatus of the type mentioned in the opening paragraph, which enables a smaller sound pressure to be realized, which presents a considerable resistance to translation movements of the objective transverse of the optical axis, and which enables rapid and simple replacement of the objective. To this end the invention is characterized in that the combined bearing arrangement for the objective comprises a plain bearing arrangement, comprising a stationary bearing member, which is connected to the frame, is substantially coaxial with the optical axis of the objective and has an at least partly convex outer surface, as well as a movable bearing member, which is connected to the objective and has a cylindrical inner surface which with a certain amount of bearing clearance cooperates with the convex outer surface of the stationary bearing member in a sliding and pivotal fashion. As used herein, the term "cylinder" is to be understood to mean: any three-dimensional body having an axis, whose cross-section perpendicular to the axis is a closed curve and whose cylinder surface comprises generatrices parallel to the axis and extending through the closed curve. Thus, in accordance with said definition a cross-section of a cylinder need not be a circle. Should this be the case, this will be designated a "circular cylinder". In the present patent application "cylindrical" is to be understood to mean: relating to a cylinder in accordance with the foregoing definition.

If, like in the previously described known optical apparatus, the lens system is arranged at the upper end of the objective and the combined bearing arrangement is disposed near the lower end of the objective, the objective comprising a tubular sleeve in which the lens system is mounted, an embodiment of the invention is of advantage which is characterized in that: the sleeve is open at the lower end of the objective, that the frame is provided with a bearing support which extends into the sleeve through the open lower end and has a free end which is directed to the lens system; that the stationary bearing member is located on the bearing support; and that the movable bearing member is constituted by a portion of a wall of the sleeve. The absence of a diaphragm which moves along with the objective enables the sound pressure to be reduced. The higher resistance of the bearing to transverse movements of the objective is obtained by connecting the bearing support rigidly to the frame and by giving the bearing support a high rigidity of its own. The bearing clearance between the stationary and the movable bearing member can be comparatively small, for example of the order of magnitude of 10 microns, by the use of precision manufacturing methods. The objective can readily be removed in the axial direction of the stationary bearing member and is therefore readily interchangeable.

In another embodiment of the invention, the bearing support is at least partly hollow and is open at its free. The hollow part of the bearing support constitutes a housing for one or more optical and/or opto-electrical components which cooperate with the radiation beam. The hollow part of the bearing support may also accommodate a radiation source, so that an optical device of very compact construction can be obtained, which comprises the radiation source and the optical parts of the light path, as well as the electronic means for the necessary servo controls and for electrically coupling out the high-frequency signal which is modulated by the information on the record carrier.

A further embodiment of the invention is characterized in that near the free end, the bearing support comprises a cylindrical stop portion which is substantially coaxial with the optical axis of the objective and that the sleeve of the objective has an inner wall which surrounds said cylindrical stop portion with clearance in order to limit the pivotal movements of the objective relative to the bearing support. This precludes excessive pivotal movements of the objective, which could give rise to problems in the servo control for the pivotal movements. Furthermore, it is of importance that the bearing support and the sleeve of the objective are provided with seating surfaces which, in the rest position of the objective, cooperate with each other and are inclined relative to the optical axis of the objective, in order to obtain a well-defined substantially non-inclined rest position for the objective. During operation the objective is maintained in position by electromagnetic forces. However, the rest position of the objective should also be well-defined, so that when the apparatus is put into operation the objective can start from said well-defined position, thereby allowing the servo controls to lock-in immediately after the objective leaves the seating surfaces. This is to be understood to mean that immediately upon putting into operation the objective occupies such a geometrical position that the servo controls which automatically control the position of the objective during operation are not actuated.

In a known optical apparatus said electrically controllable focussing means and pivoting means comprise moving electrodynamic means, which magnetically cooperate with each other and which are connected to the objective, as well as stationary electrodynamic means, which are connected to the frame. The electrodynamic means may comprise a plurality of electric control coils, so that by the application of electric control currents to the control coils electromagnetic forces can be exerted on the objective in order to obtain focussing movements and pivotal movements. In the case of an optical apparatus whose construction in this respect is similar to the known apparatus an embodiment of the invention is of significance which is characterized in that: the moving electrodynamic means are situated laterally of the sleeve and nearer its lower end; that the moving electrodynamic means are oriented in such a way relative to the sleeve that the electrodynamic forces on the objective substantially extend through one common point on the optical axis of the lens system and that said point substantially coincides with the centre of percussion of the objective. In theoretical mechanics and as used herein the centre of percussion of a physical body is to be understood to mean the imaginary point of the body which upon the application of an energy impulse to the body in a specific direction of percussion solely performs a translation in the direction of percussion relative to an external frame of reference. An energy impulse applied to the centre of percussion causes the entire physical body to translate only. An energy pulse applied to a different point causes the body to perform a combined motion, the centre of percussion translating and all other points moreover rotating about the centre of percussion.

Thus, the last-mentioned embodiment of the invention has the advantage that the combined bearing arrangement is not subject to forces which merely serve to counteract undesired pivotal movements. The moving electrodynamic means may suitably comprise control coils with turns situated in a plane perpendicular to an imaginary connecting line between the centre of the coil and the centre of percussion. During focussing movements of the objective such coils exert only a small sound pressure, because their projected area on a plane perpendicular to the optical axis is small. The said stationary electrodynamic means may comprise an annular axially magnetised magnet which surrounds the bearing support, which annular magnet may be included in a magnetic circuit with polepieces which extend axially into the control coils and which are secured to the annular magnet. For securing the control coils to the objective an embodiment is of interest which contributes to a reduction of the sound pressure and which is characterized in that: externally of the sleeve there are provided a plurality of fins having free ends, which fins are disposed in planes substantially parallel to the optical axis of the lens system; and that the moving electrodynamic means are arranged on the free ends of the fins.

In general it will be desirable to prevent or limit rotations of the objective about the optical axis, because these could give rise to contact between the moving and the stationary parts of the apparatus. This could lead to undesired wear and to the movements of the objective being impaired. An embodiment of the invention in which rotational movements of the objective about the optical axis are not possible is characterized in that: the convex outer surface of the stationary bearing member comprises a first and a second pair of surfaces, the first pair of surfaces comprising two confronting surfaces which are at least substantially situated on an imaginary first circular cylinder with a first diameter and a first axis, which is substantially perpendicular to the optical axis of the lens system, and the second pair of surfaces comprising two confronting surfaces which are at least substantially disposed on an imaginary second circular cylinder with a second diameter and a second axis which is substantially perpendicualr to the optical axis of the lens system and also substantially perpendicular to the first axis; and that the opening in the sleeve at the location of the movable bearing member is of rectangular cross-section, with sides equal to the first and second diameters plus a distance equal to a clearance for the bearing.

The invention will now be described in more detail with reference to the drawing, which relates to some embodiments of the invention and in which:

FIG. 1 in perspective and partly in sectional view shows an optical apparatus in accordance with the invention which is suitable for a video disc player;

In FIGS. 1 to 3 corresponding parts bear the same reference numerals, said three Figures relating to the same embodiment of the invention.

Figure 1:
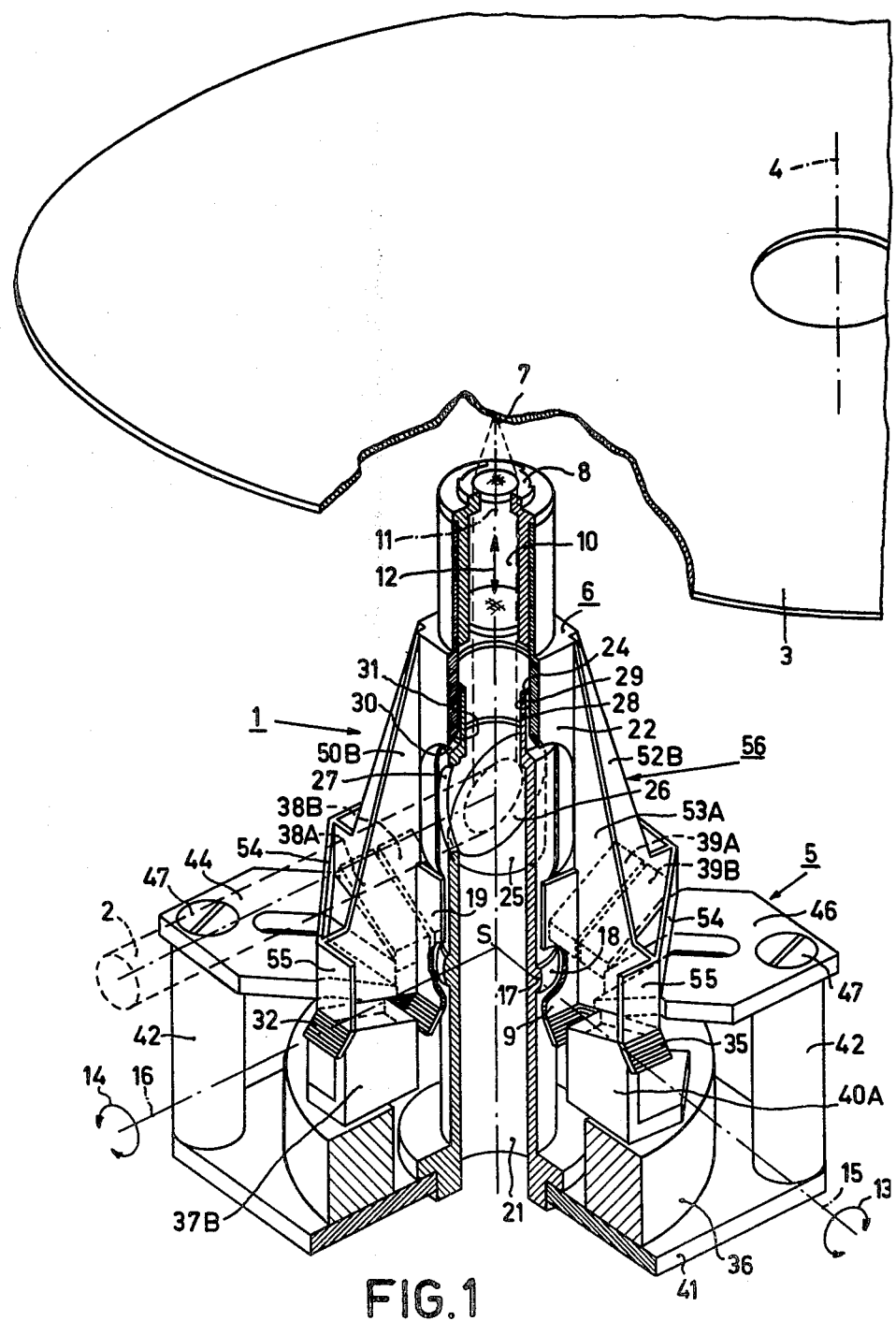

The optical apparatus 1 shown in FIG. 1 is suitable for writing and/or reading recording tracks in a reflecting recording surface of a rotary video disc 3 by means of a radiation beam 2, produced by a radiation source, not shown. Said disc is rotatable about an axis of rotation 4 by means of a drive arrangement, not shown, which falls beyond the scope of the invention and is not discussed in more detail. The optical apparatus 1 comprises a frame 5 relative to which an objective 6 is movable. Said objective serves for concentrating the radiation beam 2 to a radiation spot 7 in a focussing plane. The objective faces the recording surface of the video disc 3 with an upper end 8, its lower end 9 being remote from said disc, and comprises a symbolically represented lens system 10 having an optical axis 11.

For the movements of the objective 6 there is provided a combined bearing arrangement which is a combination of, firstly, a focussing bearing arrangement which is adapted to enable focussing movements 12 of the objective in a direction which substantially coincides with the direction of the optical axis 11 so as to enable any deviations from the average position of the recording surface of the video disc 3 in directions perpendicular to the recording surface to be followed with the focussing plane. Secondly, the combined bearing arrangement comprises a pivotal bearing arrangement which is adapted to enable pivotal movements of the objective 6 relative to the frame 5 in pivoting directions 13 and 14 about axes 15 and 16 substantially perpendicular to the optical axis 11 of the lens system 10, so as to enable any deviations from an average position of the recording track in directions disposed in the recording surface to be followed with the radiation spot 7. The pivotal movements 13 about the pivoting axis 15 serve to enable radial excursions of the track to be followed with the radiation spot 7. Pivotal movements 14 about the pivoting axis 16 serve to enable time-error corrections in tangential directions. In principle, pivotal movements about any pivoting axis passing through the intersection S of the optical axis 11 and the two pivoting axes 15 and 16 and disposed in the plane defined by the axes 15 and 16 are possible. However, such pivotal movements about pivoting axes other than the two said pivoting axes may always be regarded as a combination of two pivotal movements about the said pivoting axes. The electrically controllable focussing means for electrically realizing and controlling the pivotal movements 13 and 14 of the objective will be discussed in more detail hereinafter.

The combined bearing arrangement for the objective 6 comprises a plain bearing arrangement, which comprises a stationary bearing member 17, which is substantially coaxial with the optical axis 11 of the objective, is connected to frame 5 and has an at least partly convex outer surface 18, as well as a movable bearing member 19, which is connected to the objective 6 and has a cylindrical inner surface 20, which in a sliding and pivoting fashion cooperates with the convex outer surface 18 of the stationary bearing member 17 with a certain bearing clearance.

Figure 2:
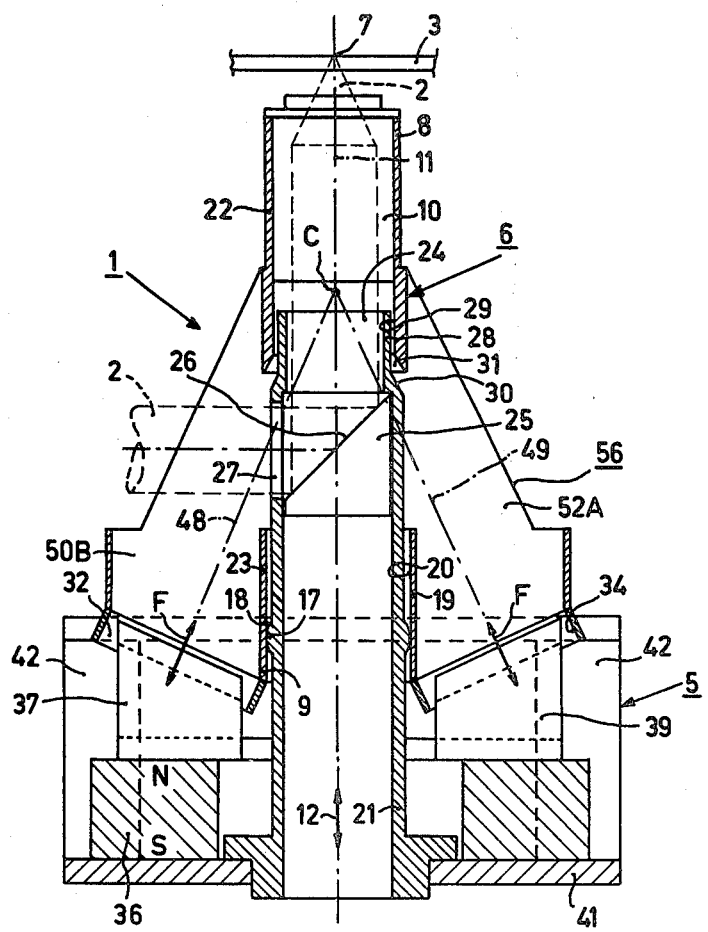
FIG. 2 is a sectional view taken on the optical axis of the apparatus shown in FIG. 1.
Figure 3:
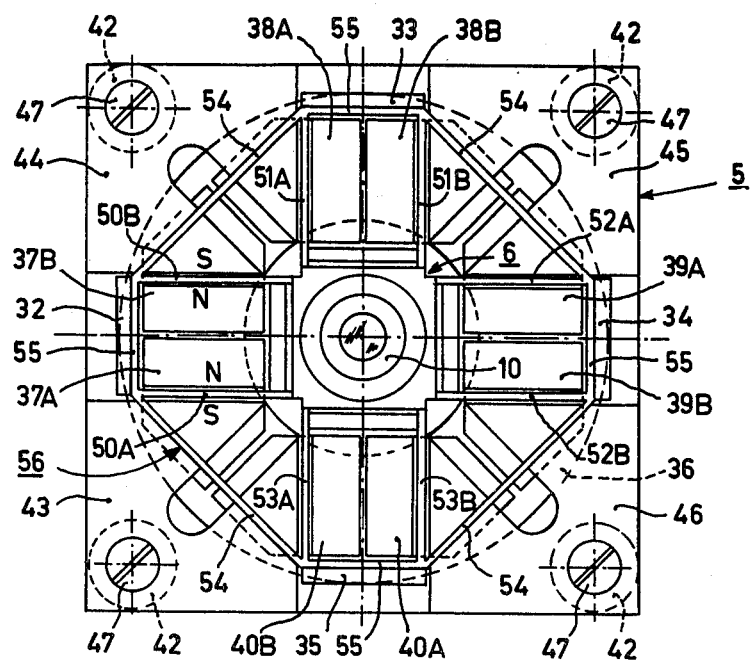
FIG. 3 is a plan view of the optical apparatus shown in FIGS. 1 and 2.

In the optical apparatus 1 shown in FIGS. 1 to 3 the lens system 10 is situated near the upper end 8 of the objective 6. The combined bearing arrangement is situated near the lower end 9 of the objective and the objective has a tubular sleeve 22 in which the lens system is mounted. At its upper end said sleeve, as is apparent from FIG. 1, has an outer circularly cylindrical portion and a portion with plane outer walls. Internally the tube is circularly cylindrical, a portion 23 near the lower end having a slightly greater diameter. At the lower end 9 the objective is open. The frame 5 is provided with a bearing support 21, which extends into the portion 23 of the sleeve 22 through the open lower end and which has a free end 24 which is directed towards the lens system 10. The stationary bearing member 17 is disposed on the bearing support 21 and the movable bearing member 19 is constituted by a portion of the wall of the sleeve portion 23. The stationary bearing member 17 is constituted by an annular portion of the bearing support 21 and is integral therewith.

The bearing support 21 is hollow over its entire length and is open at the free end 24. The hollow portion of the bearing support constitutes a housing for an optical component 25, which cooperates with the radiation beam 2. Said component is a glass component with a ground reflecting surface 26, which is glued in the bearing support 21. In its side wall the bearing support 21 has an opening 27 for the passage of the light beam 2. By means of the reflecting surface 26 the beam 2, which enters into the space inside the bearing support 21 through the opening 27 is reflected through 90° in the direction of the lens system 10. The light beam which is reflected by the video disc 3 is also reflected by the reflecting surface 26 and emerges through the opening 27.

Near the free end 24 the bearing support 21 comprises a cylindrical stop portion 28 which is substantially coaxial with the optical axis 11 of the lens system 10. The sleeve 22 of the objective has an inner wall 29, which surrounds said cylindrical stop portion with some clearance in order to limit the pivotal movements of the objective relative to the bearing support 21.

The bearing support 21 and the sleeve 22 of the objective are provided with conical seating surfaces 30 and 31 which, in the rest position of the objective, cooperate with each other and are inclined relative to the optical axis 11 of the lens system. The drawing shows the objective in the operating position, so that there is clearance between the seating surfaces. Said surfaces serve to provide a well-defined and substantially non-inclined rest position of the objective relative to the bearing support 21.

In the optical apparatus 1 as shown in FIGS. 1 to 3 the electrically controllable focussing means and pivoting means comprise magnetically cooperating electrodynamic means. Said means comprises moving electrodynamic means, which are connected to the objective 6 and as constituted by four control coils 32 to 35, and stationary electrodynamic means, which are connected to the frame 5 and comprise an axially magnetised annular magnet 36 which surrounds the bearing support 21. Said magnet is included in a magnetic circuit with polepieces 37 to 40 which extend axially into the control coils 32 to 35 and which are glued to the annular magnet 36. Each of the polepieces comprises two separate portions, which are designated A and B, between which a small air gap is formed. The magnetic circuit further comprises an iron base plate 41, four iron supports 42, and four iron yoke portions 43 to 46 which complete the permanent circuit. The base plate 41, the support 42 and the yoke portions 43 to 46 are connected to each other by means of bolts 47.

With the aid of the electrodynamic means it is possible, by applying electric control currents to the control coils 32 to 35, to exert electromagnetic forces on the objective 6 for obtaining the focussing movements 12 and the pivotal movements 14 and 15. The control coils are situated laterally of the sleeve 22, namely nearer the lower end 9 of said sleeve. They are oriented in such a way relative to the sleeve that the electrodynamic forces F on the objective 6 substantially pass through a common point C on the optical axis 11 of the lens system. Said point substantially coincides with the centre of percussion of the objective 6.

The turns of the control coils 32 to 35 are disposed in planes which are perpendicular to imaginary connecting lines (see the lines 48 and 49 in FIG. 2) between the centre of each coil and the centre of percussion C. Externally of the tube 22 there are provided a plurality of fins 50A, 50B to 53A, 53B in planes which are substantially parallel to the optical axis 11, which fins have free ends on which the control coils 32 to 35 are mounted. In order to reinforce the assembly the fins are interconnected by means of thin connecting portions 54 between the pairs of fins which extend in different directions and connecting portions 55 between the fins belonging to one pair.

In the embodiment shown in FIGS. 1–3 the sleeve 22 and the fins 50A, B to 53A, B, the connecting portions 54 and the connecting portions 55 all form part of a single integral component 56 which is made of a suitable material. The material should be selected in such a way that the objective 6 combines a minimal weight with a maximal rigidity, whilst obviously considerations of manufacturing technology also play a part in the choice of the material. One possibility is a diecast product of an aluminium alloy or injection-moulded product of a high-quality plastics. The coils 32 to 35 are glued to the body 36. The fins and the connecting portions have a minimal thickness in order to minimise the sound pressure of the body 56 during the movements 12.

Figure 4:
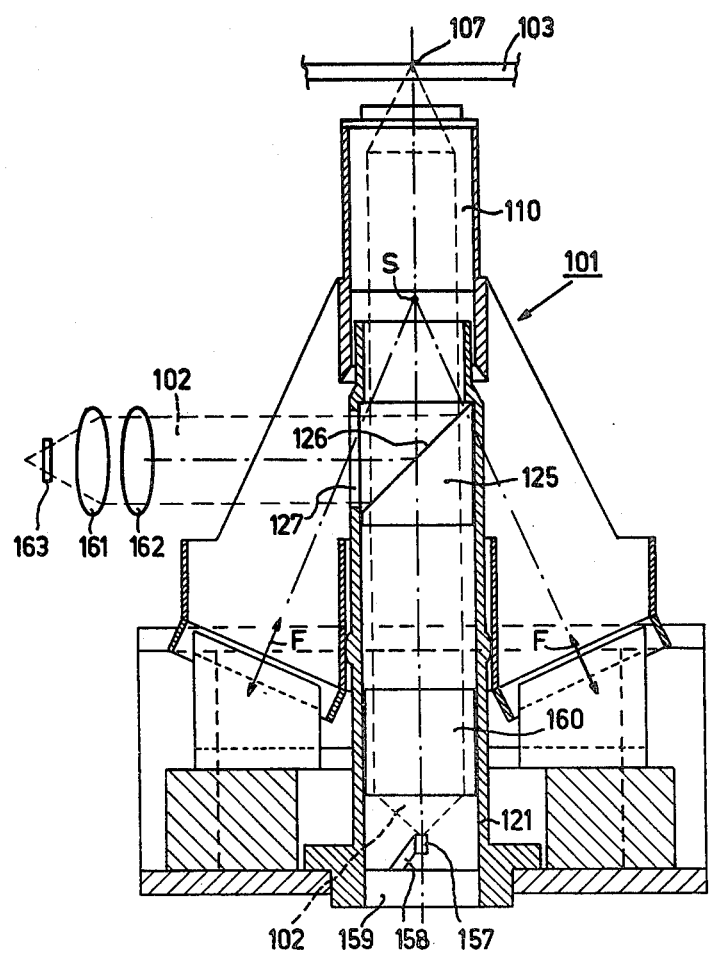
FIG. 4 is a sectional view, similar to that of FIG. 2, of a modified embodiment of the invention.

The embodiment of FIG. 4 is an optical apparatus 101 which, except for some modifications, is identical to the optical apparatus of FIGS. 1 to 3. The details of this apparatus will therefore not be discussed any further and components which are necessary for the description of the modification are designated by reference numerals, which, if corresponding parts are used in the optical apparatus 1, are increased by 100 in comparison with the reference numerals of said corresponding parts. The hollow portion of the bearing support 121 at the lower end accommodates a semiconductor laser 157, which is mounted on a support 158 on a base 159. The diverging light beam 102 emitted by the semiconductor laser is formed into a parallel beam by means of an optical system 160, which beam is directed towards the lens system 110 via the optical element 125, whose reflecting surface 126 is now semitransparent. Upon reflection by the video disc 103 a part of the light beam, after reflection at the reflecting surface 126, is reflected outwards through the opening 127 in the wall of the bearing support 121 and is concentrated at a semiconductor-diode cell 163 by means of lenses 161 and 162 (which are only represented symbolically and do not belong directly to the optical apparatus). It is also possible to design a light path which is entirely situated inside the bearing support 121, so that in that case the opening 127 in the bearing support 121 is not needed. An optical apparatus provided with such a light path is for example known from U.S. Pat. No. 4,135,083 (herewith incorporated by reference). The optical apparatus in accordance with the previously mentioned U.S. Pat. No. 4,135,206 (herewith incorporated by reference) is also intended for such a light path.

Figure 5:
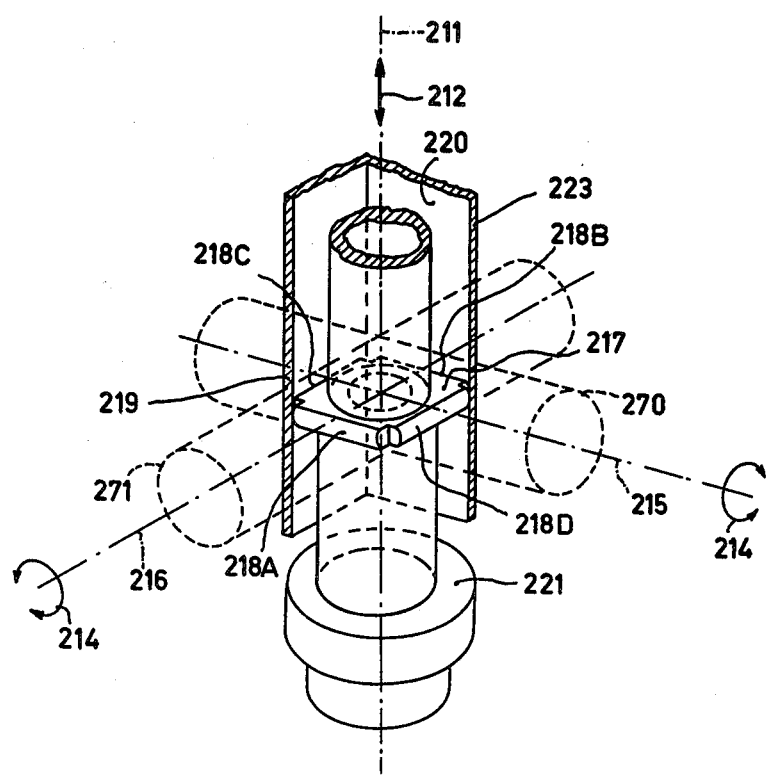
FIG. 5 is a perspective view of the bearing arrangement of an optical apparatus of yet another embodiment.

FIG. 5 relates to a detail of modified optical apparatus, which except for the bearing arrangement, could be identical to the apparatus 1 or the apparatus 101. The Figure shows a bearing support 221 to which a stationary bearing member 217 is secured. The convex outer surface of said bearing member comprises a first and second pair of surfaces. The first pair of surfaces 218A, 218B comprises two confronting surfaces which are disposed on an imaginary first circular cylinder 217, shown dashed, having a first axis 215 which is substantially perpendicularly to the optical axis 211 of the lens system, not shown. The second pair of surfaces 218C and 218D, comprises two confronting surfaces which are disposed on an imaginary second circular cylinder 271 having a second axis 216, which is also substantially perpendicular to the optical axis 211, and having a diameter equal to that of the first circular cylinder 270. At the location of the movable bearing member 219 the sleeve 223 has such an opening that the cross-section is locally square, so that the inner wall 220 is constituted by surfaces which are perpendicular to each other. These plane surfaces surround the convex surfaces 218A to D with some bearing clearance, so that the imaginary cylinders 270 and 271 are situated between confronting plane walls with some clearance. The sleeve 223 can thus perform focussing movements 212 in a direction of the optical axis 211 and pivotal movements 213 about the axis 215 of the first circular cylinder 217 as well as pivotal movements 214 about the axis 216 of the circular cylinder 271. In principle other movements are not possible, apart from the very small movements which may be caused by the bearing clearance.

What is claimed is:
1. An optical apparatus for, during operation, writing and/or reading recording tracks in a recording surface of a record carrier (3) by means of a radiation beam (2) which is produced by a radiation source and, more specifically, for scanning video and/or audio recording tracks in a reflecting recording surface of a rotary video or audio disc by means of a light beam, which apparatus comprises:

a frame (5), an objective (6) for concentrating the radiation beam (2) to a radiation spot (7) in a focussing plane, which objective has an upper end (8), which during operation faces the recording surface of a record carrier (3), and a lower end (9), which is remote from the recording surface, and comprises a lens system (10) with an optical axis (11), a combined bearing arrangement for the objective, which arrangement is a combination of, firstly, a focussing bearing arrangement which is adapted to realize focussing movements (12) of the objective between a rest position and an operating position and relative to the frame in a direction which at least substantially coincides with the optical axis so as to enable any deviations from an average position of the recording surface of the record carrier in a direction perpendicular to the recording surface to be followed with the focussing plane, and, secondly, a pivotal bearing arrangement which is adapted to realize pivotal movements of the objective relative to the frame in pivoting directions (13, 14) about an axis (15, 16) substantially perpendicular to the optical axis (11) of the lens system (10), so as to enable any deviations from an average position of the recording track in directions situated in the recording surface to be followed with the radiation spot (7);

electrically controllable focussing means (32-46) for electrically realizing and controlling the focussing movements (12) of the objective (6);

as well as electrically controllable pivoting means (32-46) for electrically realizing and controlling the pivotal movements of the objective, characterized in that the combined bearing arrangement for the objective comprises a plain bearing arrangement, comprising a stationary bearing member (17), which is substantially coaxial with the optical axis (11) of the objective (6), is connected to the frame (5) and has an at least partly convex outer surface (18), as well as a movable bearing member (19), which is connected to the objective and has a cylindrical inner surface (20) which with a certain amount of bearing clearance cooperates with the convex outer surface (18) of the stationary bearing member (17) in a sliding and pivotal fashion.

2. An optical apparatus as claimed in claim 1, the lens system (10) being mounted at the upper end (8) of the objective (6) and the combined bearing arrangement being situated near the lower end (9) of the objective, the objective comprising a tubular sleeve (22) in which the lens system is mounted, characterized in that, the sleeve (22) is open at the lower end (9) of the objective, that the frame (5) is provided with a bearing support (21) which extends into the sleeve (22) through the open lower end and has a free end (24) which is directed to the lens system (10), that the stationary bearing member (17) is situated on the bearing support (21), and that the movable bearing member (19) is constituted by a portion of a wall (23) of the sleeve (22).

3. An optical apparatus as claimed in claim 2, characterized in that the bearing support (21) is at least partly hollow and is open at its free end (24), the hollow part of the bearing support constituting a housing for one or more optical and/or opto-electrical components (25) which cooperate with the radiation beam (2).

4. An optical apparatus (101) as claimed in claim 3, characterized in that the hollow portion (121) of the bearing support also accommodates a radiation source (157).

5. An optical apparatus as claimed in claims 2, 3 or 4, characterized in that near the free end (24) the bearing support (21) comprises a cylindrical stop portion (28) which is substantially coaxial with the optical axis (11) of the objective and that the sleeve (22) of the objective has an inner wall (29) which surrounds said cylindrical stop portion with clearance in order to limit the pivotal movements of the objective relative to the bearing support (21).

6. An optical apparatus as claimed in claims 2, 3 or 4 characterized in that the bearing support (21) and the sleeve (22) of the objective are provided with seating surfaces (30, 31) which, in the rest position of the objective, cooperate with each other and are inclined relative to the optical axis of the objective.

7. An optical apparatus as claimed in claims 2, 3 or 4, characterized in that, the convex outer surface of the stationary bearing member (217) comprises a first and a second pair of surfaces, the first pair of surfaces (218A, 218B) comprising two confronting surfaces, which are at least substantially disposed on an imaginary first circular cylinder (270) with a first diameter and a first axis, (215) which is substantially perpendicular to the optical axis (211) of the lens system, and the second pair of surfaces (218C, 218D) comprising two confronting surfaces which are at least substantially disposed on an imaginary second circular cylinder (271) with a second diameter and a second axis (216), which is substantially perpendicular to the optical axis (211) of the lens system and also substantially perpendicular to the first axis (215), and that the opening in the sleeve (223) at the location of the movable bearing member (219) is of rectangular cross-section, with opposed sides spaced from each other at distances which are equal to the first and second diameters plus a clearance for the bearing. (FIG. 5).

8. An optical apparatus as claimed in claims 2, 3 or 4 wherein the electrically controllable focussing means and pivoting means comprise moving electrodynamic means (32-35) connected to the objective, as well as stationary electrodynamic means (36-46) which magnetically cooperate with the moving electrodynamic means which are connected to the frame (5), which electrodynamic means comprise a plurality of electric control coils (32-35), so that by the application of electric control currents to the control coils electromagnetic forces can be exerted on the objective in order to obtain focussing movements (12) and pivotal movements (13-14), said apparatus being characterized in that, the moving electrodynamic means (32-35) are disposed laterally of the sleeve (22) and nearer its lower end (9) and the moving electrodynamic means (32-35) are oriented in such a way relative to the sleeve (22) that the electromagnetic forces (F) on the objective (6) substantially extend through one common point (C) on the optical axis (11) of the lens system and that said point substantially coincides with the centre of percussion of the objective.

9. An optical apparatus as claimed in claim 8, characterized in that the moving electrodynamic means comprise control coils (32-35) with turns situated in a plane perpendicular to an imaginary connecting line between the centre of the coil and the centre of percussion (C).

10. An optical apparatus as claimed in claim 8, characterized in that the stationary electrodynamic means comprise an annular axially magnetised magnet (36) which surrounds the bearing support, the annular magnet being included in a magnetic circuit with polepieces (37-40) which extend axially into the control coils (32-35) and which are secured to the annular magnet (36).

11. An optical apparatus as claimed in claim 8, characterized in that externally of the sleeve (22) there are provided a plurality of fins (50-53) having free ends, which fins are disposed in planes substantially parallel to the optical axis (11) of the lens system and that the moving electrodynamic means (32-35) are arranged on the free ends of the fins.

* * * * *